Feb. 18, 1969 R. P. PARDY 3,427,950
MOTOR VEHICLE HEATING AND VENTILATING SYSTEM
Filed Oct. 13, 1966
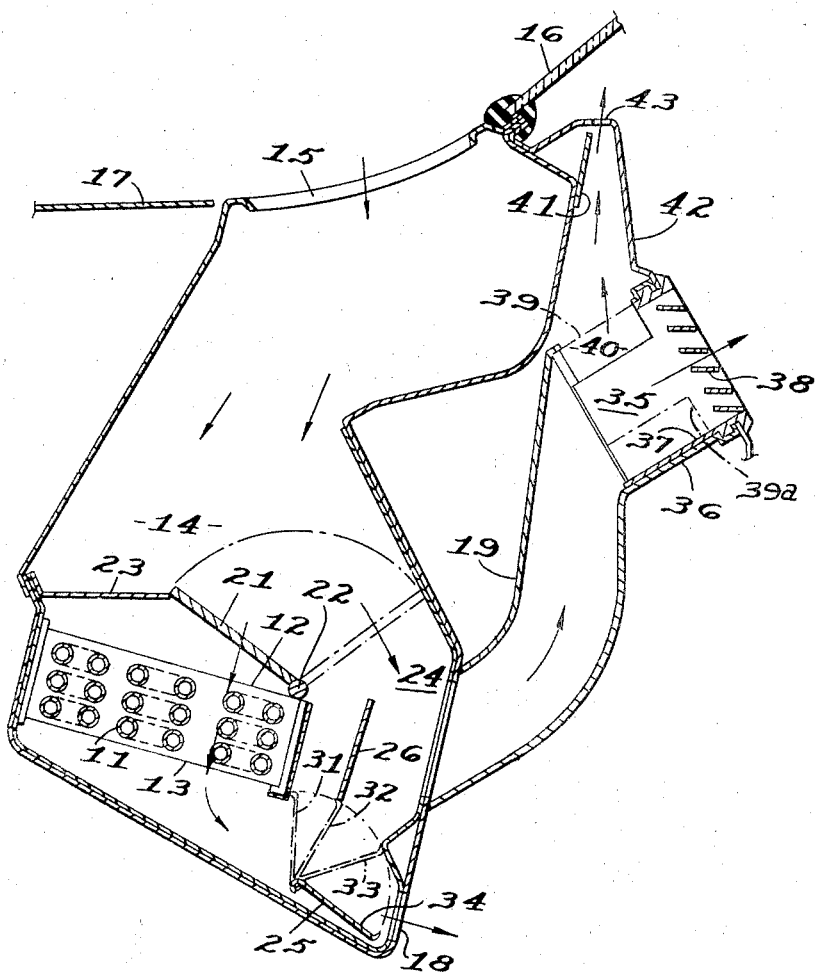
INVENTOR
RONALD PETER PARDY
BY John R. Faulkner
Clifford L. Sadler
ATTORNEYS United States Patent Office 3,427,950
Patented Feb. 18, 1969

3,427,950
MOTOR VEHICLE HEATING AND VENTILATING SYSTEM
Ronald P. Pardy, Hockley, Essex, England, assignor to Ford Motor Company, Dearborn, Mich., a corporation of Delaware
Filed Oct. 13, 1966, Ser. No. 586,480
Claims priority, application Great Britain, Oct. 14, 1965, 43,565/65
U.S. Cl. 98—2　　　　　　　　　　　　　　　　　7 Claims
Int. Cl. B60h 1/22

A motor vehicle heating and ventilating system including a heat exchanger portion, a bypass portion, and valve means constructed to direct the air flow from the heat exchanger portion against the normal flow of the bypass portion, thereby assuring complete mixture of heated and bypass air.

The invention relates to combination heating and ventilating systems for motor vehicles.

In the presently preferred embodiment of the invention, a motor vehicle heating and ventilating system is constructed in accordance with the invention, the position of a temperature control valve controls the proportion of inlet air which flows through a heater core and the proportion of inlet air which bypasses the heater core through a bypass passage. A first outlet to the interior of the vehicle is arranged in the vicinity of the outlet from the heater core and a second outlet to the interior of the vehicle is arranged in the bypass passage. A distribution flap valve can be set to each of the following positions: (1) a first position where it closes the outlet from the heater core; (2) a second position where it directs air from the heater core away from the first outlet toward the bypass passage generally against the direction of flow of the bypass air, so that air from the core and bypass air are mixed together; (3) a third position in which the first outlet is closed so that all the inlet air is directed to the second outlet; or (4) a fourth position in which the first inlet is in free communication with the heater core outlet so that most of the air which flows through the core is directed to the second outlet.

In addition, the presently preferred embodiment of the present invention incorporates the following features. (a) An outlet from an air heater communicates with one end of a fixed open ended cylinder; (b) a rotatable cylinder which is open at both ends is rotatably mounted coaxially within the fixed cylinder; (c) there is an aperture in the cylindrical wall of the fixed cylinder; (d) there is an aperture in the cylindrical wall of the rotable cylinder which in some positions of rotation coincides with the aperture in the fixed cylinder and permits air flow from the air heater through the apertures but in other positions of rotation closes the aperture in the fixed cylinder; and (e) the rotatable cylinder is provided with vanes which deflect air flowing through the cylinders from the air heater from an axial path at the exit from the cylinders.

The invention is hereinafter particularly described with reference to the accompanying drawing which illustrates a motor vehicle heating and ventilating system in accordance with the invention. The single figure of the drawing shows a cross sectional side view of an under-cowl mounted embodiment of the invention. Arrows in the drawing indicate the directions in which air flows in the system. It should be understood, however, that for certain conditions there may be no flow of air in some of the parts of the system where an air flow direction is indicated by an arrow.

The heating and ventilation system includes a heater core 11. The core 11 is supplied with hot water from the cooling system of the engine that drives the motor vehicle. Air passages extend through the heater core 11 from its inlet side 12 to the outlet side 13. The core 11 functions as a heat exchanger to warm the air which passes through it.

The core 11 is situated within a heater compartment 14 of the vehicle. An air inlet 15 to the heater compartment 14 is situated between the windshield 16 and the hood 17 of the vehicle. The upper part of the compartment 14 contains baffles (not shown) which prevents rain water that enters the inlet 15 from passing down to the lower part of the heater compartment 14.

There are two outlets from the heater compartment 14. One of the outlets 18 is situated at the bottom of the heater compartment 14 and near to the feet of front seat passengers in the vehicle. The second outlet from the heater compartment is constituted by two tubes 19 (only one of which is shown) which extend upward from the heater compartment 14 toward the instrument panel of the vehicle. The two outlet tubes 19 are positioned symmetrically one each side of the longitudinal center line of the vehicle.

A temperature control valve in the form of a flap or valve 21 is pivotable about a pivot 22 and can be set to any position between the two extreme positions shown. In the position shown in full, the temperature control flap cooperates with a plate 23 to completely seal off the inlet 12 to the heater core 11. In this position, a bypass passage 24 in the heater compartment 14 is completely open. As the temperature control flap is moved from the position shown in full, to the position indicated by chain-dotted lines, the inlet 12 to the core 11 is gradually opened and the bypass passage 24 is gradually closed. Thus, the position of the temperature control flap 21 determines the proportion of inlet air flowing through the inlet 15 which is passed to the core 11 and the proportion of air which bypasses the core.

A distribution flap or flow control valve 25 can be set to any of four discrete positions 31, 32, 33 and 34. In position 31, the outlet 13 from the core 11 is completely closed and the unit functions as a ventilation system. Cold air flows through the bypass passage and is distributed to both outlets 18 and 19. In this position of the distribution flap, the temperature control flap 21 determines the quantity of cold air which is passed through the heater compartment. When the temperature control flap is in the position shown in chain-dotted lines, there is no flow at all through the heater. As the temperature control flap is moved toward the position shown in full, an increase in volume of cold air flows through the heater and this air is distributed between the two outlets 18 and 19.

In position 32, the distribution flap 25 is in line with a fixed baffle 26 in the bypass passage 24 and directs air from the outlet of the heater core 11 away from the first outlet 18 of the heater compartment toward the bypass passage 24. The direction of this air from the heater core 11 is generally against the direction of flow of bypass air in the bypass passage 24. As a result of the opposing directions of flow of the air, the heated air from the core 11 and the cold bypass air are thoroughly mixed together. This mixed warm air is then distributed between the outlets 18 and 19 of the heater compartment. The temperature of this warm air depends on the position of temperature control flap. If the temperature control flap is in a position where it completely closes the core 11, there will be no heated air to mix with the cold air. At intermediate positions of the temperature control flap, the proportion of heated and cold air will depend on the position of the flap. In the position shown by chain-dotted lines, of the inlet, air is directed through the heater and there is no cold air to mix with the heated air.

In the third position 33 of the distribution flap 25, the first outlet 18 from the heater compartment is completely closed so that all the inlet air is directed to the outlet 19. Here again, the temperature of this air depends on the position of the temperature control flap 21.

In position 34 of the distribution flap 25, the first outlet 18 is in free communication with the outlet 13 from the heater core. There is also an open passage from the heater compartment to the second outlet 19. When the temperature control flap is in the position indicated by chain-dotted lines, all the air from the inlet 15 passes through the core 11. Most of this air is passed out through the outlet 18, but a small proportion of the air passes up the outlet 19. In intermediate positions of the temperature control flap, most of the heated air from the outlet of the core 11 passes out through the outlet 18 and most of the cold bypass air passes out through the outlet 19. When the temperature control flap 21 is set in the position shown in full, no air passes through the core 11 and the cold bypass air is divided between the outlets 18 and 19 of the heater compartment.

The upper ends of the two tubes 19, which constitute the second outlet from the heater compartment 14, are connected to two identical nozzles 35. One of these nozzles will be described in detail. The nozzle 35 has an outer fixed cylinder 36 which is open at both ends and which is directed generally toward the faces of passengers within the vehicle. The upper end of the tube 19 is connected directly to one end of the cylinder 36. A rotatable cylinder 37 is mounted within the cylinder 36 and is free to rotate therein. One end of the cylinder 37 is in direct communication with the tube 19 and the other end is directed toward the interior of the vehicle. Vanes 38 mounted within the inner cylinder direct air away from the cylinder axis at a small angle. Thus, rotation of the cylinder 37 within the cylinder 36 rotates the angle at which air is deflected into the vehicle.

There is an aperture 39 in the upper part of the cylindrical wall of the cylinder 36. There is a corresponding larger aperture 40 in the cylindrical wall of the cylinder 37 so that over a range of rotational positions of the cylinder 37, the two apertures coincide and permit air to flow upward through the aperature 39. In other rotational positions of the cylinder 37, the two apertures do not coincide so that all the air entering the tube 19 is directed past the vanes 38 directly into the passenger compartment of the vehicle. When the two apertures 39 and 40 coincide, a proportion of air flows past the vanes 38 directly into the passenger compartment and the remainder of the air flows upward to a windshield defroster. The chain dotted line 39a represents the closed position of the aperture 39 when cylinder 36 is rotated approximately 180 degrees.

The defroster comprises two plates 41 and 42 which converge as they extend upward. The aperture 39 in fixed cylinder 36 communicates with the gap formed between the bottom ends of the two plates 41 and 42. The orifice 43 formed by the tops of two plates 41 and 42 directs air flowing through the defroster to the windshield 16. It has been found that the simple structure of the two converging plates 41 and 42 is sufficient to effectively direct air from the aperture 39 onto a substantial width of the windshield, without the provision of two further plates which extend upward and diverge from the sides of the aperture 39.

The foregoing description constitutes the presently preferred embodiment of this invention. Modifications and alterations may occur to those skileld in the art that will come within the scope and spirit of the following claims.

I claim:
1. A heating and ventilating system are a motor vehicle comprising a casing having an air inlet:
   a heat exchanger portion having an inlet and an outlet and constructed to change the temperature of air flowing therethrough,
   a bypass portion having an inlet and an outlet and constructed to convey air bypassing said heat exchanger portion,
   outlet means in said casing,
   a flow control valve movable between several positions,
   said flow valve having one position constructed to direct air flowing through said heat exchanger portion toward said outlet of said bypass portion against the normal direction of air flow through just mentioned outlet.
2. A heating and ventilating system according to claim 1 and including:
   said outlet means comprising an outlet structure rotatably mounted in said casing,
   said outlet structure being constructed to direct air flow away into the passenger compartment of said vehicle,
   said casing having an opening in one wall thereof,
   said outlet structure having an opening registerable with said opening of said casing,
   said outlet structure being rotatable whereby said openings may be placed in alignment or whereby said outlet structure may be positioned with said openings are out of alignment and the opening in said casing closed,
   a windshield defroster outlet structure communictable with the opening in said casing.
3. A heating and ventilating system for a motor vehicle according to claim 1 and including:
   a temperature control valve movable between a first position closing off said bypass portion and a second position closing off said inlet of said heat exchanger portion,
   said flow valve having another position closing said outlet of said heat exchanger portion.
4. A heating and ventilating system for a motor vehicle according to claim 1 and including:
   said outlet means including a pair of spaced outlets in said casing,
   one of said spaced outlets being on the area of the instrument panel of said motor vehicle and the other of said spaced outlets being on the area of the toe board of said vehicle,
   said flow valve having another position closing said outlet of said heat exchanger portion,
   said flow valve having a third position directing air flow from said heat exchanger portion toward said one spaced outlet and closing said other spaced outlet,
   said flow valve having a fourth position permitting air flow through said other spaced outlet.
5. A heating and ventilating system for a motor vehicle according to claim 1 and including:
   a temperature control valve movable between a first position closing off said bypass portion and a second position closing off said inlet of said heat exchanger portion,
   said outlet means including a pair of spaced outlets in said casing,
   one of said spaced outlets being in the area of the instrument panel of said motor vehicle and the other of said spaced outlets being in the area of the toe board of said vehicle,
   said flow valve having another position closing said outlet of said heat exchanger portion,
   said flow valve having a third position directing air flow from said heat exchanger portion toward said one spaced outlet and closing said other spaced outlet,
   said flow valve having a fourth position permitting air flow through said other spaced outlet.
6. A heating and ventilating system according to claim 9 and including:
   one of said spaced outlets comprising an outlet structure rotatably mounted in said casing,
   said outlet structure being constructed to direct air flow into the passenger compartment of said vehicle,
said casing having an opening in one wall thereof,
said outlet structure having an opening registerable with said opening of said casing,
said outlet structure being rotatable whereby said openings may be placed in alignment or whereby said outlet structure may be positioned with said openings out of alignment and the opening in said casing closed,
a windshield defroster outlet structure communictable with the opening in said casing.

7. An air flow control mechanism having an air flow casing:
a generally cylindrical outlet structure rotatably mounted in said casing,
said casing having an opening in one wall thereof,
said cylindrical outlet structure having a wall opening registerable with said opening of said casing,
said outlet structure being rotatable whereby said openings may be placed in alignment or whereby said outlet structure may be positioned with said openings out of alignment and the opening in said casing closed,
a second outlet structure communicatable with the opening in said casing,
said mechanism being constructed for a motor vehicle having a window and a passenger compartment,
said cylindrical outlet structure having an open end receiving air flow and another end having angled louvers constructed to direct air flow away from the axis of said outlet structure and into said passenger compartment,
said second outlet structure comprising a window defroster constructed to direct air flow against said window.

References Cited

UNITED STATES PATENTS

| | | | |
|---|---|---|---|
| 2,718,839 | 9/1955 | Wilfert | 98—2.4 |
| 2,729,158 | 1/1956 | Wilfert | 89—2.4 |
| 2,738,718 | 3/1956 | Reynolds | 98—2.4 |
| 2,860,567 | 11/1958 | Wilfert | 98—2.4 |

FOREIGN PATENTS 728,016  4/1955  Great Britain.

EDWARD J. MICHAEL, *Primary Examiner.*

U.S. Cl. X.R.

237—34